United States Patent [19]

Lissaman et al.

[11] Patent Number: 5,035,382
[45] Date of Patent: Jul. 30, 1991

[54] RAPID ASSEMBLY AIRCRAFT FOR GROUND SURVEILLANCE

[75] Inventors: Peter B. S. Lissaman, Altadena; W. Ray Morgan, Simi Valley; Martyn B. Cowley, Simi Valley; Charles J. Sink, Simi Valley; William D. Watson, Simi Valley, all of Calif.

[73] Assignee: Aerovironment, Inc., Monrovia, Calif.

[21] Appl. No.: 339,090

[22] Filed: Apr. 17, 1989

[51] Int. Cl.⁵ .............................................. B64C 13/20
[52] U.S. Cl. .................................... 244/190; 244/120; 244/79; 244/3.12; 358/109; 446/34
[58] Field of Search .............. 244/189, 190, 120, 119, 244/78, 79, 226, 3.12; 358/109; 446/88, 93, 34

[56] References Cited

U.S. PATENT DOCUMENTS

| | | | |
|---|---|---|---|
| 3,200,748 | 8/1965 | Macatician | 244/79 |
| 3,900,198 | 8/1975 | Conner | 244/79 |
| 3,935,664 | 2/1976 | Neuhierl | 446/34 |
| 4,121,791 | 10/1978 | Taylor et al. | 244/120 |
| 4,160,253 | 7/1979 | Mabuchi et al. | 244/190 |
| 4,218,702 | 8/1980 | Brocard et al. | 358/109 |
| 4,591,114 | 5/1986 | Block | 244/190 |

FOREIGN PATENT DOCUMENTS

| | | | |
|---|---|---|---|
| 934570 | 1/1948 | France | 446/93 |
| 0174829 | 10/1984 | Japan | 244/190 |
| 0912717 | 12/1962 | United Kingdom | 446/93 |

Primary Examiner—Joseph F. Peters, Jr.
Assistant Examiner—Christopher P. Ellis
Attorney, Agent, or Firm—William W. Haefliger

[57] ABSTRACT

A terrain surveillance, powered aircraft is disclosed to have an on-board video camera that is not gimballed relative to the aircraft, the aircraft typically comprising multiple components; the method of the invention including: assembling the components into aircraft configuration at or near a launch site; launching the aircraft at that site with no human pilot on board same; remotely controlling the flight path of the aircraft by radio or cable link, to fly to a location for terrain surveillance; operating the on-board video camera to survey the terrain while varying yaw of the aircraft to provide sweep viewing of the terrain; and recovering the aircraft by controlling its flight to steeply descend to a landing zone.

26 Claims, 4 Drawing Sheets

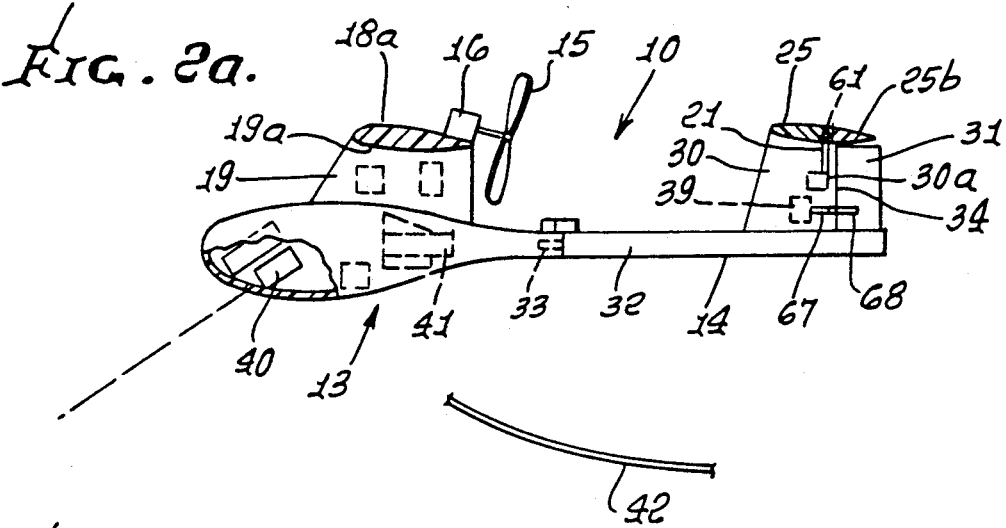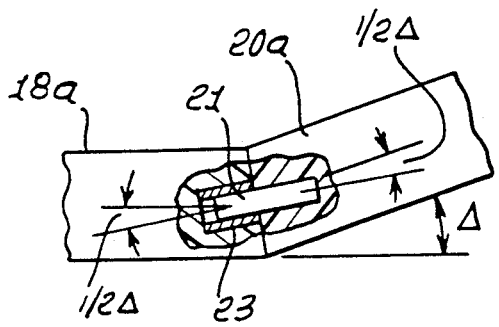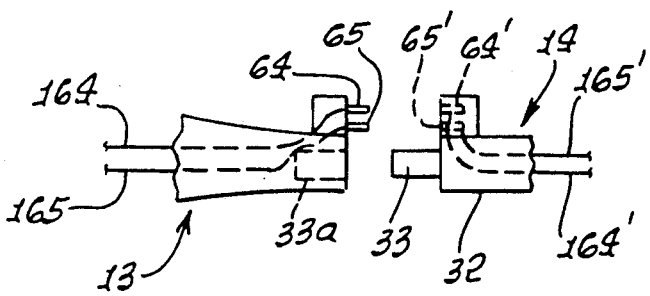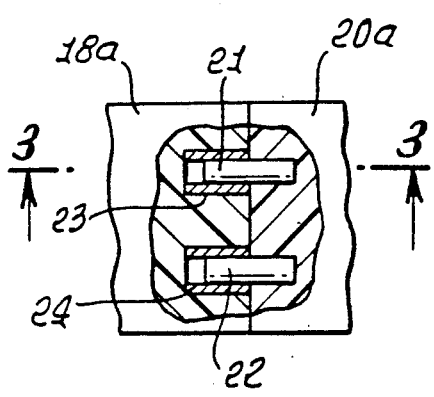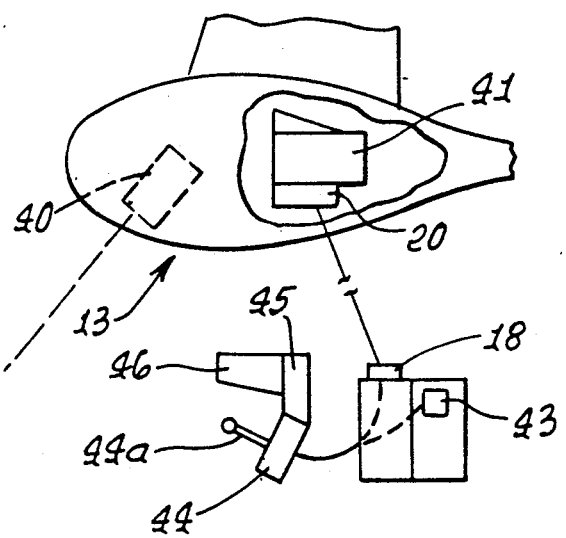

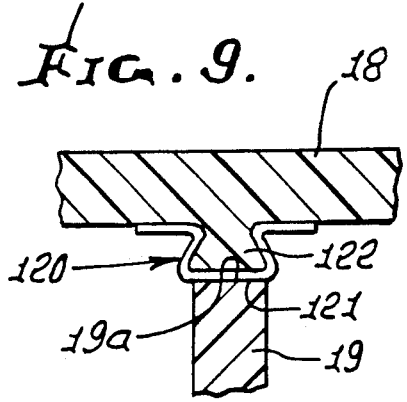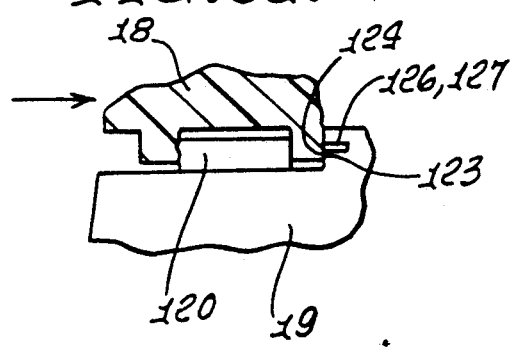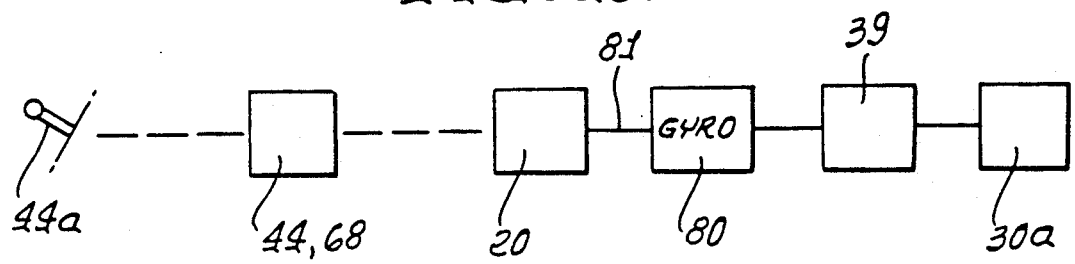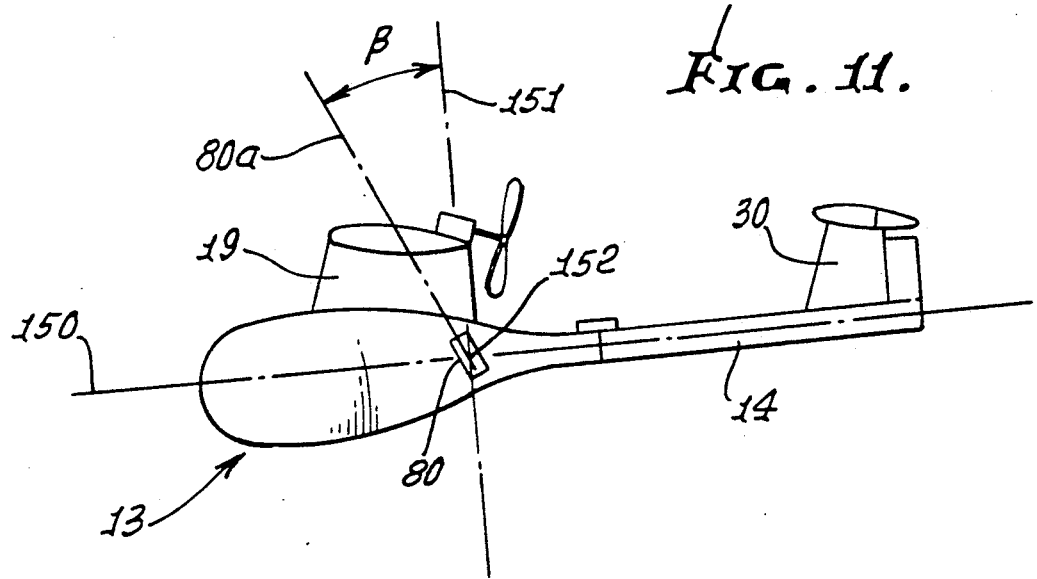

RAPID ASSEMBLY AIRCRAFT FOR GROUND SURVEILLANCE

BACKGROUND OF THE INVENTION

This invention relates generally to remotely controlled unmanned aircraft; and more particularly to hand launchable aircraft, the components of which are easily assembled in the field, or disassembled so as to fit in a small size package, the aircraft carrying sensor instrumentation for terrain surveillance. The aircraft is inherently stable and therefore simple to operate, and an autonomous "deep-stall" landing mode requires no piloting skills.

There is a need for small size aircraft of the type described, which will enable data transmission from a sensor such as a television camera carried on board the aircraft, the data to be transmitted by radio frequency, fiber optic cable, or similar means and received by a ground receiver, as for example at the point of launch. Such as an aircraft must be capable of transport in a small size container to the point of launch, then quickly assembled and launched, for data retrieval.

SUMMARY OF THE INVENTION

It is a major object of the invention to provide an aircraft meeting the above need. Basically, such an aircraft, in accord with the invention includes:

a) a fuselage having a relatively enlarged size forward portion for equipment including television camera installation, and a relatively reduced size rearward portion, with vertical tail surface, capable of dissassembly for packaging, b) a propellor, electric motor drive therefor, and electrical battery means for energizing the motor, all carried by said fuselage forward portion, c) a center wing panel having removable attachment to said fuselage forward portion to extend transversely relative thereto, d) wing tips having removable attachment to opposite ends of said center panel to extend laterally therefrom, e) a horizontal tail (stabilizer) structure having limited travel from normal flight, but large travel for deep-stall landings, f) whereby the center wing panel, wing tips and tail (stabilizer) structure may be individually fitted in the package, alongside the fuselage, g) at least one of such removable attachments including interfittable connections, for both structural and electrical connection.

Rate gyroscope feed-back control of rudder pivoting, in response to aircraft roll and/or yaw, enhances platform stability of the aircraft for optimum television surveillance of terrain.

Also provided is a package in which wing tips, center wing panel and tail (stabilizer) structure are interfitted alongside said fuselage, the package length being substantially less than the overall fuselage length or wing span of the aircraft when assembled.

Typically the center wing panel and each of the wing tips have plug-in pin and socket, or snap fastener interconnection; and the tail structure removably attaches to the fuselage rearward portion. Also, the fuselage rearward portion typically comprises a tail boom having removable attachment to the fuselage forward portion, automatically making electrical and mechanical connection for control of tail surfaces.

Further, a surveillance sensor is typically carried by the fuselage forward portion, and a communication link to and from ground equipment is in signal transmitting communication with the sensor. The sensor may comprise a television camera.

Such an aircraft may weigh as little as about five pounds; can be packed in a hand-carried container three feet long and one foot by one foot in cross section, carried to the field quite easily, for assembly of the components at the hand-launch site. Using a coded radio or video link, or a fiber optics cable for FM or AM data transmission, the signal is not detectable by others; and the aircraft is silent, small, and difficult to see at elevations of 500 to 1000 feet.

These and other objects and advantages of the invention, as well as the details of an illustrative embodiment, will be more fully understood from the following specification and drawings, in which:

DRAWING DESCRIPTION

FIG. 2a is a schematic side elevation taken through the aircraft fuselage forward portion, and also showing the fuselage rearward portion and tail fin;

FIG. 3 is a section taken on line 3—3 of FIG. 5;

FIG. 4A is a view taken on lines 4—4 of FIG. 3, and showing connection of fuselage rear and forward portions.

FIG. 4B is a sectional side view of the forward fuselage contents, consisting of control equipment, battery power supply, electric motor propulsion and sensor package with radio frequency or fiber optic down link transmitter;

FIG. 5 is a plan view showing wing tip and wing center panel interconnection;

FIG. 9 is an enlarged vertical section taken through a pylon and wing center section interconnection;

FIG. 9a is a side elevation showing center wing panel rearward stop connection to a pylon;

FIG. 10 is a control circuit block diagram; and

FIG. 11 is a side elevation showing rate gyroscope tilted mounting to the aircraft.

DETAILED DESCRIPTION

Figure 1:
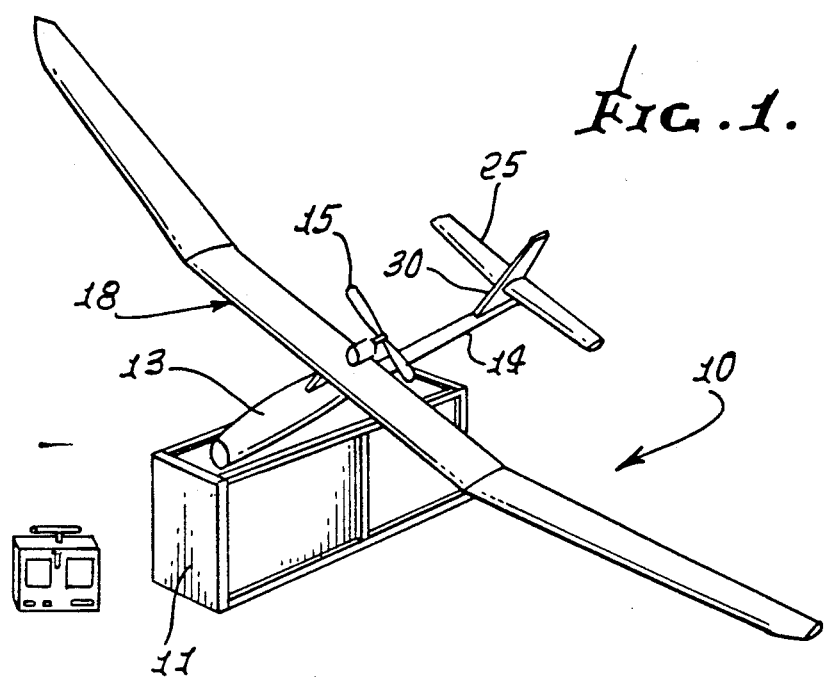
FIG. 1 is a perspective view of an aircraft, and the package to contain its components.
Figure 2:
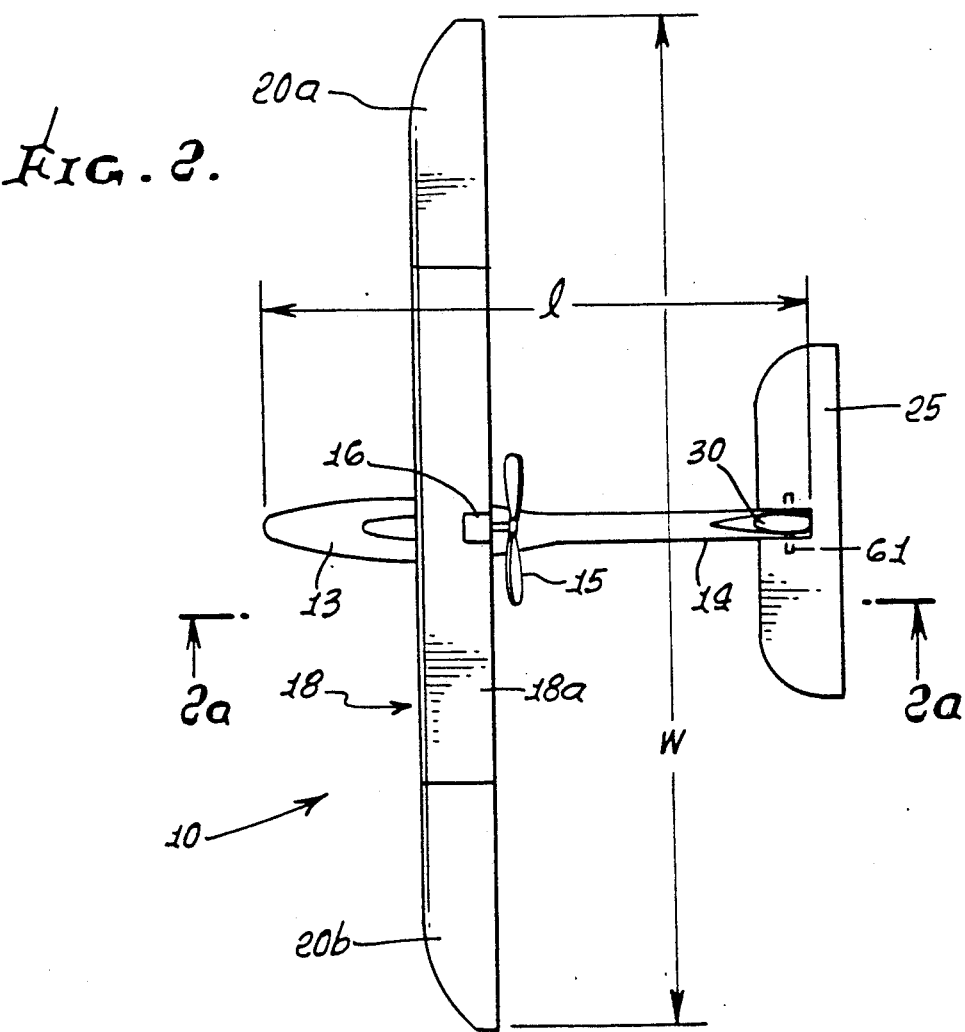
FIG. 2 is a plan view of the FIG. 1 aircraft.
Figure 7:
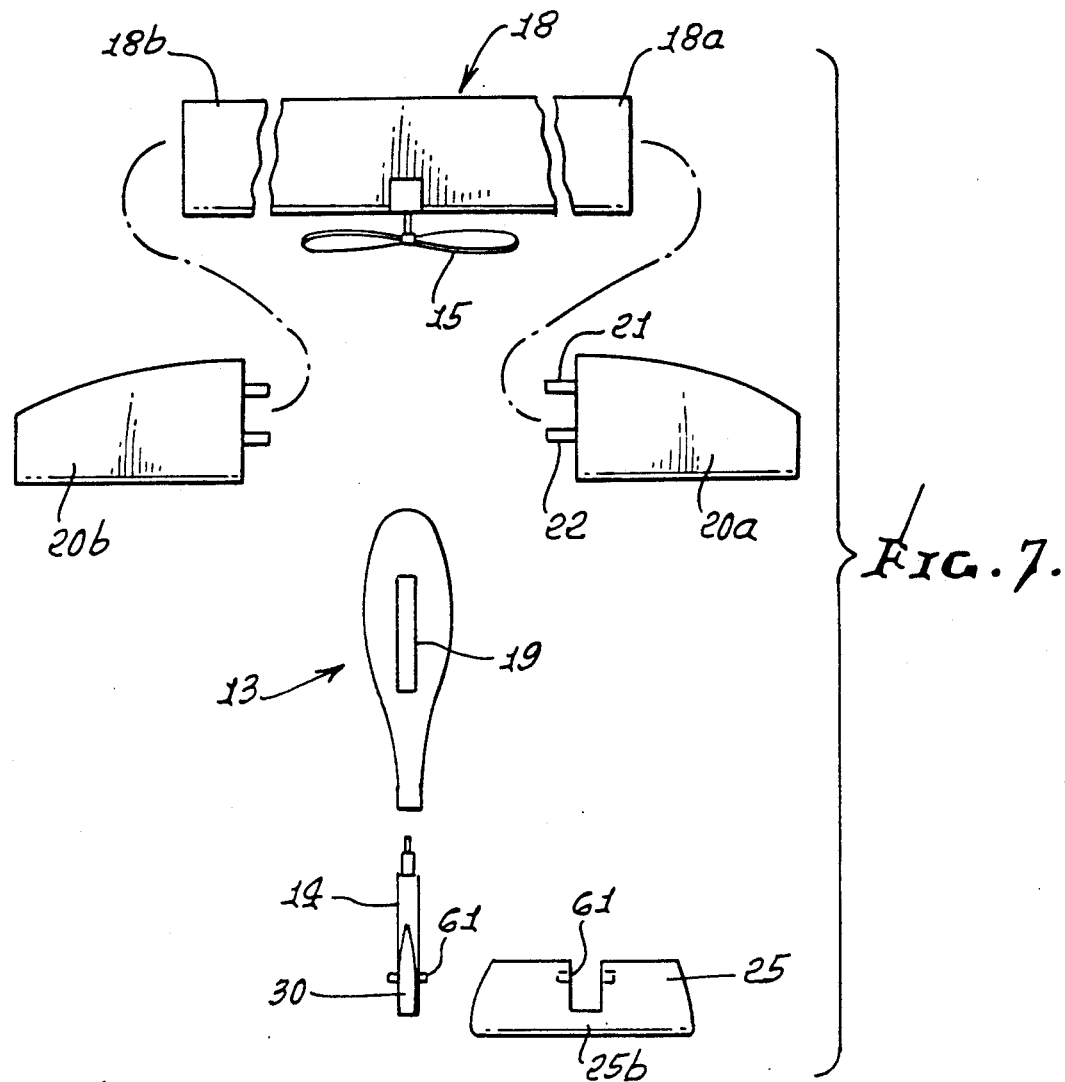
FIG. 7 is a plan view schematically showing disassembled components of the aircraft.
Figure 8:
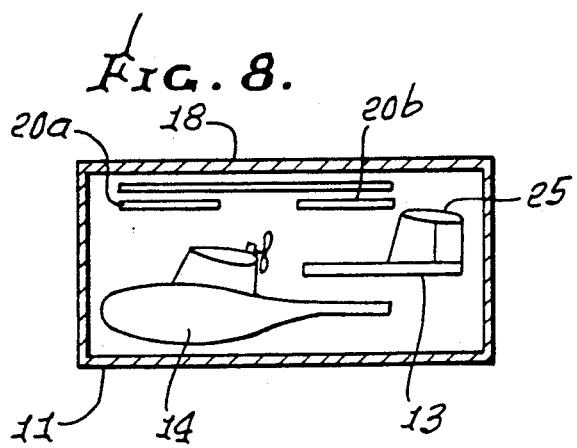
FIG. 8 is a side elevation showing interfitting of the FIG. 7 components in a package.
Figure 6:
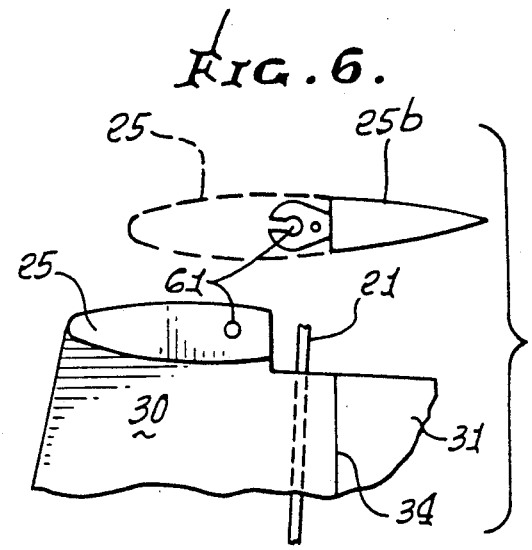
FIG. 6 is a side view showing stabilizer and fuselage rear portion interconnection.

In the drawings, the manually launchable aircraft 10 is adapted to be assembled from components as shown in FIG. 7, and that fit closely together in a package 11, as viewed in FIG. 8. That package is substantially shorter in length "1" (as for example about 3 feet) than the overall wing span "w" (for example about 9 feet) of the assembled aircraft. In FIG. 7, the components include a fuselage having a relatively enlarged volume section 13, and a relatively reduced size rearward tail-boom portion 14 with a vertical tail (stabilizer) 30.

Also, the components include a center wing panel 18 that is laterally oriented relative to the longitudinal fuselage portions, the panel 18 having removable attachment to the fuselage forward portion via the top 19a of a pylon 19 on that portion. See FIG. 9a showing a U-shaped bracket 120 attached at 121 to top 19a. A forwardly elongated tongue 122 closely slidably fits rearwardly into bracket 120, the tongue being integral with the underside of the center wing panel 18. As seen in FIG. 9a, a forward facing stop 123 on the pylon engages shoulder 124 on the tongue to position the panel 18 on the pylon. Propeller 15 and electrical motor drive 16 are carried by the panel 18, and contacts 126 and 127 make up on the panel 18 received on the pylon to electrically connect lithium battery 17 with the drive 16. Wing tips 20a and 20b have plug-in removable attachment to the opposite ends 18a and 18b of the panel 18 to provide dihedral. See for example the pin and socket connections at 21 and 22, and 23 and 24 shown in FIG. 5. The pins are anchored in 18a and are received in metal sleeves 23 and 24 anchored in 20b. See also FIG. 7. Rechargeable batteries can be used.

Further, the components include a horizontal stabilizer 25 having attachment to the fin 30 with a section 25b pivoted at 61 to the stabilizer and rotated by a strut 21 displaced endwise by a servo motor 30a located in the base of fin 30. The flying surfaces 18, 20a, 20b, 25, and 30 may typically consist of high strength-to-weight fibers and plastics, which may be foamed.

The fuselage rearward portion, and particularly tail boom 32, has removable attachment to the fuselage forward portion, as for example plug-in 33 attachment to socket 33a formed by the fuselage forward portion. See FIG. 4A. Make-up electrical pin and socket connections at 64 and 65, and 64' and 65' prevent relative rotation of 32 and 33. Vertical tail fin 30 is attached to the tail boom, as shown. The rudder 31 may have hinged attachment to the fin 30, at 34, to pivot about a vertical hinge axis, and is pivotally actuated by a rotary solenoid 39 in the base of fin 30. A strut 67 connects the solenoid to a bell crank 68 attached to the rudder to guide the aircraft. Electrical control wires at 164 and 165, and at 164' and 165' for the motors 30a and 39 extend in 13 and 14 (see FIG. 4a) and to make up electrical pin and socket connection 64 and 65, and 64' and 65'.

The invention also contemplates the provision of a sensor 40, as for example a television camera, carried by the fuselage forward portion and aimed toward the ground to help navigate the aircraft and detect installations and targets; as well as provision of a link communication system which typically comprises a radio frequency transmitter 41, or alternatively a fiber optic umbilical cable 42, placing the aircraft in signal transmitting communication with a ground based receiver 43, control unit 44, and TV monitor 45 having a head shroud 46. A spooling bobbin for cable 42 may also be located at 41. A ground controller 44, including flight control stick 44a is connected with transmitter 18 that transmits signals to receiver 20 on the craft, which controls the motor drive 16 as well as flight control actuators 30a and 39, via circuit leads 164 and 164 on the fuselage. Propeller 15 driven by 16, rotates at the rear of section 18, and above the tail boom, as shown.

A stability augmentation gyro and motor throttle control appears at 80, for controlling flight without pilot connection. That gyro may comprise a rate gyroscope for controlling the rudder, via the control circuit shown in FIG. 10. The control stick 44a transmits rudder control signals via radio link 44 and 68 to receiver 20 on the aircraft. The gyro is connected at 81 with the receiver, and its output is connected at 164' and 165' with the rudder and elevator actuators 39 and 30a. The gyro is carried by the fuselage forward portion, as in FIG. 11.

As shown in FIG. 11, the aircraft has a principal axis 150 which extends forwardly, as shown, through the fuselage. Aircraft yaw axis 151 is normal to axis 150, and intersects it at 152. The rate gyroscope 80 is mounted on the aircraft at or near 152, and has its axis of sensitivity 80a tilted forwardly from axis 151 at an angle $\beta$, which is between 10° and 50°. Accordingly, the rate gyroscope is responsive to roll of the aircraft about axis 150 to produce a first output that varies with the degree of roll; also, the rate gyroscope is responsive to yaw of the aircraft to produce a second output that varies with the degree of yaw. Since the aircraft is intended to provide a stable platform for the television camera (defeated by roll and by yaw) and since yaw is generally preceded by roll, the control system optimally senses incipient yaw, and corrects the same. In this regard, the gyro first and second outputs referred to are connected in feedback relation with the rudder actuator 38 to cause the rudder to pivot and counteract the sensed roll and/or yaw. Manual input via stick 44a overrides the gyro output. The two gyro outputs can be a "vectored" single output.

Note that the aircraft has no ailerons on its wings to control for roll; and that the aircraft wing has substantial dihedral, enabling rate gyro control of stability using rudder control only.

Unusually advantageous features of the invention include:

a) robust, lightweight construction manufactured from fiber-reinforced and foam plastic;
b) collapsibility of components to fit in a packaged box;
c) simple rudder and elevator control with stability augmentation gyro and motor throttle control;
d) protection of propeller at rear of wing;
e) radio control—or fiber optic control link;
f) stability augmentation gyro; capable of flight without pilot mechanism;
g) hand launch capability by single operator from unprepared terrain without need for launching equipment;
h) electric drive, with long shelf life, ease of starting; and on-off capability in flight for silent operation;
i) television surveillance of terrain capability, with signal transmission to ground receiver via coded radio frequency or fiber optic cable, so signal not detectable by others;
j) deep-stall recovery for stable vertical descent on unprepared terrain with high probability of undamaged landings.

Accordingly, a terrain surveillance, powdered aircraft is provided to have an on-board video camera that is not gimballed relative to the aircraft, the aircraft typically comprising multiple components. The method of its operation includes a) assembling the components into aircraft configuration at or near a launch site,
b) launching the aircraft at the site with no human pilot on board same,
c) remotely controlling the flight path of the aircraft by radio or cable link, to fly to a location for terrain surveillance,
d) operating the on-board video camera to survey the terrain while varying yaw of the aircraft to provide sweep viewing of the terrain,
e) and recovering the aircraft by controlling its flight to steeply descend to a landing zone.

Typically, the launching step comprises hand launching; and control of aircraft flight to steeply descend includes deep stalling of the aircraft toward a target recovery zone. The aircraft typically includes a wing and an electrically driven propeller, and said assembling of the components includes installing of said propeller at a rearward location relative to the wing. Assembling of the components typically includes providing the wing with wing tip portion dihedral, between 5 and 8 degrees.

Operation also typically includes viewing, at a ground control station, the terrain being surveyed by the camera and while varying the yaw of the aircraft; and transmitting the video output of the camera, by video link, to a video receiver at the ground control station. That station may be operated in a hand-held mode during video link transmission. The method further typically includes installing a gyroscope on the aircraft to have its sensitive axis tilted relative to the aircraft and to control the rudder of the aircraft in feedback control mode, thereby to minimize wind induced rolling and yawing of the aircraft, during video camera survey of the terrain.

We claim:

1. In a manually launchable aircraft adapted to be assembled from components that fit closely together in a package substantially shorter than the wing span of the aircraft, the combination comprising
   a) a fuselage having a relatively enlarged forward portion and a relatively reduced size rearward portion, with vertical stabilizer area, the aircraft having a principal axis which extends forwardly through the fuselage, and a yaw axis which extends normal to the principal axis and upwardly and downwardly relative to the fuselage, the principal axis and yaw axis defining an intersection locus,
   b) a propeller, electric motor drive therefor, and electric battery means for energizing the motor, all carried by said fuselage forward portion,
   c) a center wing panel having removable attachment to said fuselage forward portion to extend transversely relative thereto,
   d) wing tips having removable attachment to opposite ends of said center panel to extend laterally therefrom, said wing tips having dihedral of at least about 5°,
   e) and horizontal tail structure attached to said fuselage rearward portion, said fuselage rearward portion removably attached to said fuselage forward portion,
   f) whereby said center wing panel, wing tips and tail structure may be individually fitted in said package, alongside said fuselage forward and rearward portions,
   g) at least one of said removable attachments including interfittable pin and socket connections,
   h) the aircraft having a rudder, and including a rate gyroscope carried by said fuselage and operatively connected with the rudder for controlling same, the gyroscope located at said locus and having an axis of sensitivity extending upwardly and tilted forwardly from said locus and relative to said yaw axis at an angle between 10° and 50° relative thereto to be responsive to both yaw and roll of the aircraft about said yaw axis and said principal axis, respectively, for controlling the rudder to counteract both yaw and roll, which are both controlled by the rudder.

2. The combination of claim 1 including a package in which said wing tips, center wing panel and tail structure are interfitted alongside said fuselage, the package length being substantially less than the overall wing span of the aircraft with said wing tips attached to the opposite ends of the center wing panel.

3. The combination of claim 1 wherein the center wing panel and each of the wing tips have plug-in pin and socket interconnection.

4. The combination of claim 1 wherein the tail structure includes a generally horizontally extending stabilizer supporting elevator means.

5. The combination of claim 1 wherein the fuselage rearward portion comprises a tail boom having removable lengthwise attachment to the fuselage forward portion.

6. The combination of claim 4 wherein the fuselage rearward portion comprises a forwardly projecting boom having a removable plug-in attachment to the fuselage forward portion.

7. The combination of claim 5 wherein the propeller extends above the fuselage forward portion.

8. The combination of claim 1 including a sensor carried by the fuselage forward portion, and means operatively connected with the aircraft and in signal transmitting communication with the sensor, said means comprising
   a radio frequency transmitter.

9. The combination of claim 1 including a sensor carried by the fuselage forward portion, and means operatively connected with the aircraft and in signal transmitting communication with the sensor, said means comprising a fiber optic cable carried by a bobbin on the fuselage to unreel therefrom to maintain signal transmitting communication with a control station at the earth surface.

10. In an aircraft having a fuselage, wing, stabilizer and a rudder, and engine means for thrusting the aircraft, the wing having substantially dihedral, and being free of ailerons, the combination comprising
   a) a single rate gyroscope carried by the aircraft and operatively connected with the rudder for controlling the rudder,
   b) the aircraft having a principal axis extending lengthwise of the fuselage, and yaw axis normal to the principal axis, and upwardly and downwardly relative to the fuselage, the principal axis and yaw axis defining an intersection locus,
   c) the gyroscope having an axis of sensitivity which extends upwardly and is tilted forwardly from said locus and relative to the yaw axis, whereby the rate gyroscope is responsive to roll of the aircraft about said principal axis to produce a first output, and the gyroscope is also responsive to yaw of the aircraft about said yaw axis to produce a second output,
   d) and means operatively connected between the gyroscope and rudder to be responsive to either of said outputs to displace the rudder in a direction to counteract said roll and/or said yaw, whereby rate gyroscope control of stability is obtained using rudder control only.

11. The combination of claim 10 including a ground-to-air control system operatively connected with the aircraft to control said rudder and said stabilizer.

12. The combination of claim 11 including a terrain observing video camera carried by said aircraft in a position to observe the terrain, and a video transmitting link between the camera and a video receiver on the ground.

13. The combination of claim 10 including
   h) the fuselage having a relatively enlarged forward portion and a relatively reduced size rearward portion, with vertical stabilizer area,
   i) a propeller, said engine means including an electric motor drive and electrical battery means for energizing the motor drive,
   j) the wing having a center wing panel with removable attachment to said fuselage forward portion to extend transversely relative thereto, the propeller and drive carried by said center wing panel,
   k) and the wing having wing tips with removable attachment to opposite ends of said center panel extending laterally therefrom.

14. The combination of claim 13 wherein the fuselage forward portion includes a vertical pylon that projects upwardly above the level of the remainder of the fuselage forward portion, the pylon having an upper portion that extends generally forwardly, the center wing panel having rearwardly interlockable connection with said upper portion of the pylon allowing relatively forward detachment of the center wing panel from the pylon upon predetermined shock impact of the fuselage forward portion with the ground, there being electrical terminals carried by the pylon and center wing panel that interconnect in response to said rearward interlocking connection of the upper portion of the pylon with the center wing panel, and which detach in response to said relatively forward detachment of the center wing panel from the pylon, said one of the terminals connected with the battery, and the other of the terminals connected with the propeller drive.

15. In a terrain surveillance aircraft of relatively small size, adapted to be assembled from components that fit closely together, the combination comprising
   a) a fuselage having a relatively enlarged forward portion and a relatively reduced size rearward portion, with vertical stabilizer area, the aircraft having a principal axis which extends forwardly through the fuselage, and a yaw axis which extends normal to the principal axis and upwardly and downwardly relative to the fuselage, the principal axis and yaw axis defining an intersection locus,
   b) a propeller, electric motor drive therefor, all carried by said fuselage forward portion,
   c) a center wing panel having removable attachment to said fuselage forward portion to extend transversely relative thereto,
   d) wing tips having attachment to opposite ends of said center panel to extend laterally therefrom, and with dihedral relative thereto,
   e) and horizontal tail structure attached to said fuselage rearward portion, said fuselage rearward portion removably attached to said fuselage forward portion,
   f) the fuselage forward portion includes a vertical pylon that projects upwardly above the level of the remainder of the fuselage forward portion, the pylon having an upper portion that extends generally forwardly, the center wing panel having rearwardly interlockable connection with said upper portion of the pylon allowing relatively forward detachment of the center wing panel from the pylon upon predetermined shock impact of the fuselage forward portion with the ground, there being electrical terminals carried by the pylon and center wing panel that interconnect in response to said rearward interlocking connection of the upper portion of the pylon with the center wing panel, and which detach in response to said relatively forward detachment of the center wing panel from the pylon, said one of the terminals connected with the battery, and the other of the terminals connected with the propeller drive,
   g) the aircraft having a rudder, and including a rate gyroscope carried by said fuselage and operatively connected with the rudder for controlling same, the gyroscope located at said locus and having an axis of sensitivity extending upwardly and tilted forwardly from said locus and relative to said yaw axis at an angle between 10 degrees and 50 degrees relative thereto to be responsive to both yaw and roll of the aircraft about said yaw axis and said principal axis, respectively, for controlling the rudder to counteract both yaw and roll, which are both controlled by the rudder.

16. The combination of claim 15 including a terrain observing video camera carried by said fuselage forward portion, a rudder pivotably carried by said fuselage rearward portion, and a rate gyroscope means carried by the fuselage forward portion and operatively connected to the rudder in controlling relation therewith to correct the yaw and roll motion of the aircraft, whereby the aircraft provides a substantially stabilized platform for said video camera.

17. In the method of operating a terrain surveillance, powdered aircraft having an on-board video camera that is not gimballed relative to the aircraft, the aircraft comprising multiple components including a rudder, the steps that include
   a) assembling said components into aircraft configuration at of near a launch site, the aircraft then having a principal axis and a yaw axis defining an intersection locus,
   b) launching the aircraft at said site with no human pilot on board same,
   c) remotely controlling the flight path of the aircraft by radio or cable link, to fly to a location for terrain surveillance,
   d) operating the on-board video camera to survey the terrain while varying yaw of the aircraft to provide sweep viewing of the terrain,
   e) and recovering the aircraft by controlling its flight to steeply descend to a landing zone,
   f) said assembling step including installing a gyroscope on the aircraft at closely proximate said locus to have its sensitive axis extended upwardly and tilted forwardly from said locus and relative to the yaw axis at between 10° and 40° and to control the rudder of the aircraft in feed-back control mode, thereby to minimize wind induced rolling and yawing of the aircraft about said principal axis and said yaw axis respectively, during said video camera survey of the terrain said gyroscope operated as the only automatic feed back control of said yawing and rolling.

18. The method of claim 17 wherein said launching step comprises hand launching.

19. The method of claim 17 wherein said control of aircraft flight to steeply descend includes deep stalling of the aircraft toward a target recovery zone.

20. The method of claim 17 wherein said aircraft includes a wing and an electrically driven propeller, and said assembling of the components includes installing of said propeller at a rearward location relative to said wing.

21. The method of claim 20 wherein said assembling of the components includes providing the wing with wing tip portion dihedral, between 5 and 8 degrees.

22. The method of claim 1 which includes viewing, at a ground control station, the terrain being surveyed by the camera and while varying said yaw of the aircraft.

23. The method of claim 22 including transmitting the video output of the camera, by video link, to a video receiver at the ground control station.

24. The method of claim 22 including recording the video output of the camera, on recording media.

25. The method of claim 17 including operating said ground station in a hand-held mode during said video link transmission.

26. The combination of claim 15 including a sensor carried by the fuselage forward portion, and means operatively connected with the aircraft and in signal transmitting communication with the sensor, said means comprising a fiber optics cable.

* * * * *